(12) United States Patent
Sakaguchi

(10) Patent No.: US 10,988,201 B2
(45) Date of Patent: Apr. 27, 2021

(54) MOTORCYCLE

(71) Applicant: KAWASAKI JUKOGYO KABUSHIKI KAISHA, Kobe (JP)

(72) Inventor: Shogo Sakaguchi, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 294 days.

(21) Appl. No.: 16/196,834

(22) Filed: Nov. 20, 2018

(65) Prior Publication Data

US 2019/0152551 A1    May 23, 2019

(30) Foreign Application Priority Data

Nov. 21, 2017   (JP) ............................. JP2017-223369

(51) Int. Cl.
  *B62K 11/04*      (2006.01)
  *B62J 37/00*      (2006.01)
  *F02M 25/08*      (2006.01)

(52) U.S. Cl.
  CPC ............... *B62K 11/04* (2013.01); *B62J 37/00* (2013.01); *F02M 25/089* (2013.01)

(58) Field of Classification Search
  None
  See application file for complete search history.

(56) References Cited

U.S. PATENT DOCUMENTS

| | | | | |
|---|---|---|---|---|
| 8,844,666 B2 * | 9/2014 | Ashida | ..................... | B62J 37/00 180/219 |
| 8,857,556 B2 * | 10/2014 | Nishimura | ............. | B62K 19/46 180/291 |
| 10,233,873 B2 * | 3/2019 | Ono | ........................ | B62J 37/00 |
| 10,486,762 B2 * | 11/2019 | Plazotta | ................. | B62K 11/04 |
| 10,570,858 B2 * | 2/2020 | Morita | ................. | F02M 37/007 |
| 2007/0018420 A1 | 1/2007 | Hoshi | | |
| 2014/0060955 A1 * | 3/2014 | Kono | ................. | F02M 25/0854 180/291 |
| 2018/0179992 A1 | 6/2018 | Morita et al. | | |
| 2020/0140030 A1 * | 5/2020 | Ishii | ................... | F02M 25/0854 |

FOREIGN PATENT DOCUMENTS

| | | |
|---|---|---|
| JP | S53131122 U | 10/1978 |
| JP | H04038281 A | 2/1992 |
| JP | 2007008434 A | 1/2007 |
| JP | 2015174600 A  * | 10/2015 |
| JP | 2018103873 A | 7/2018 |

* cited by examiner

*Primary Examiner* — Kevin Hurley
(74) *Attorney, Agent, or Firm* — Alleman Hall Creasman & Tuttle LLP

(57) ABSTRACT

A motorcycle comprises a vehicle body frame including a head pipe part, a pair of right and left main frame parts extending rearward from the head pipe part while being inclined in a downward direction, a down frame part extending downward from the head pipe part to a location that is below the main frame parts, and a bridge frame part coupling the main frame parts to the down frame part; a fuel tank supported by the main frame parts; and a canister connected to the fuel tank via an inlet tube and configured to store therein evaporated fuel generated in the fuel tank. The canister is disposed on a first side in a vehicle width direction. In a side view, the canister is disposed in a region surrounded by the main frame part, the down frame part, and the bridge frame part.

11 Claims, 3 Drawing Sheets

MOTORCYCLE

CROSS-REFERENCE TO THE RELATED APPLICATION

This application claims priority to and the benefit of Japanese Patent Application No. 2017-223369 filed on Nov. 21, 2017, the entire disclosure of which is incorporated herein by reference.

BACKGROUND OF THE INVENTION

Field of the Invention

The present invention relates to a motorcycle including a canister which stores evaporated fuel (evaporative emission) therein.

Description of the Related Art

Japanese Laid-Open Patent Application Publication No. Hei. 4-38281 discloses a motorcycle in which a canister is mounted. The canister serves to collect evaporated fuel (evaporative emission) from a fuel tank to prevent the evaporated fuel from being released to atmospheric air. In this motorcycle, the canister is mounted on a stay attached on an engine mounting fastened to a bridge frame coupling a main frame (tank rail) to a down frame.

In this configuration, the canister is disposed outward of the bridge frame in a vehicle width direction and below the bridge frame. For this reason, it is difficult to protect the canister from external forces. In addition, a space in which components are arranged is limited in the motorcycle. Under the circumstances, there is a need to efficiently place the canister in the motorcycle.

SUMMARY OF THE INVENTION

In view of the above-described circumstances, an object of the present invention is to protect the canister and improve the efficiency of placement of components (members).

According to an aspect of the present invention, a motorcycle comprises: a vehicle body frame including a head pipe part, a pair of right and left main frame parts extending rearward from the head pipe part while being inclined in a downward direction, a down frame part extending downward from the head pipe part to a location that is below the pair of right and left main frame parts, and a bridge frame part coupling one of the pair of right and left main frame parts to the down frame part; a fuel tank supported by the pair of right and left main frame parts; and a canister connected to the fuel tank via an inlet tube and configured to store therein evaporated fuel generated in the fuel tank, wherein the canister is disposed on a first side in a vehicle width direction, with respect to a vehicle body center line extending in a forward and rearward direction, and wherein in a side view, the canister is disposed in a region surrounded by the one of the pair of right and left main frame parts, the down frame part, and the bridge frame part.

In accordance with this configuration, the canister can be disposed at a location that is close to the fuel tank without using a space for other components (constituents) while surrounding the canister by the frame parts. This makes it possible to protect the canister, more efficiently place vehicle components, and prevent an increase in the length of the inlet tube.

In the side view, the canister may be disposed to extend along the one of the pair of right and left main frame parts.

In accordance with this configuration, the canister can be efficiently disposed in a narrow space.

The motorcycle may further comprise a drain tube connected to a rear end portion of the canister, and in a top plan view, the canister may cross the one of the pair of right and left main frame parts so that the rear end portion of the canister is directed inward in the vehicle width direction.

In accordance with this configuration, the drain tube extends inward of the one of the pair of right and left main frame parts in the vehicle width direction. This allows the drain tube to avoid the bridge frame part without being forcibly bent. Since the drain tube is away from the main frame part, it becomes possible to prevent a situation in which the drain tube rubs the weld (welding) beads or the like of the main frame part.

The inlet tube may extend inward in the vehicle width direction, from a front end portion of the canister.

In accordance with this configuration, since the front end portion of the canister is directed outward in the vehicle width direction, with respect to the main frame part, the inlet tube can extend toward the fuel tank while avoiding the main frame part without being forcibly bent.

In a front view, the canister may be exposed so that the canister is seen from a front.

In accordance with this configuration, the air flowing from the front directly contacts the canister. Even in a case where the temperature of the canister is increased by the heat radiated from the engine, the canister can be naturally cooled by the air.

The motorcycle may further comprise an air-cooled engine disposed below the fuel tank, and the canister may be entirely disposed above and forward of an upper end of the air-cooled engine.

In accordance with this configuration, since the canister disposed forward of the engine is located above the engine, the canister does not impede the air flowing toward the engine. Therefore, high air-cooling efficiency of the engine can be maintained.

The motorcycle may further comprise a front fender disposed above a front wheel, and the canister may be disposed above a rear edge of the front fender.

In accordance with this configuration, it becomes possible to prevent a situation in which muddy water or the like flying from the front wheel contacts the canister.

The motorcycle may further comprise a shroud covering the canister from an outer side in the vehicle width direction.

In accordance with this configuration, the external appearance of the motorcycle can be improved while protecting the canister.

In a top plan view, the pair of right and left main frame parts may include a pair of right and left main frame front parts extending rearward and outward in the vehicle width direction from the head pipe part, and a pair of right and left main frame rear parts extending rearward in the forward and rearward direction from the pair of right and left main frame front parts, respectively, and in the top plan view, the canister may overlap with one of the pair of right and left main frame front parts.

In accordance with this configuration, it becomes possible to suitably protect the canister by the main frame part from external forces applied from above and easily reduce the width of the motorcycle.

In a front view, a center of gravity of the canister may be located in a region surrounded by the one of the pair of right and left main frame parts, the down frame part, and the bridge frame part.

In accordance with this configuration, the canister can be efficiently disposed and protected.

The above and further objects, features and advantages of the present invention will more fully be apparent from the following detailed description of preferred embodiment with reference to the accompanying drawings.

DETAILED DESCRIPTION OF THE PREFERRED EMBODIMENTS

Hereinafter, the embodiment of the present invention will be described with reference to the drawings. Throughout the drawings, the same or corresponding constituents are designated by the same reference symbols, and will not be described in detail. The stated directions are from the perspective of a rider straddling a motorcycle.

Figure 1:
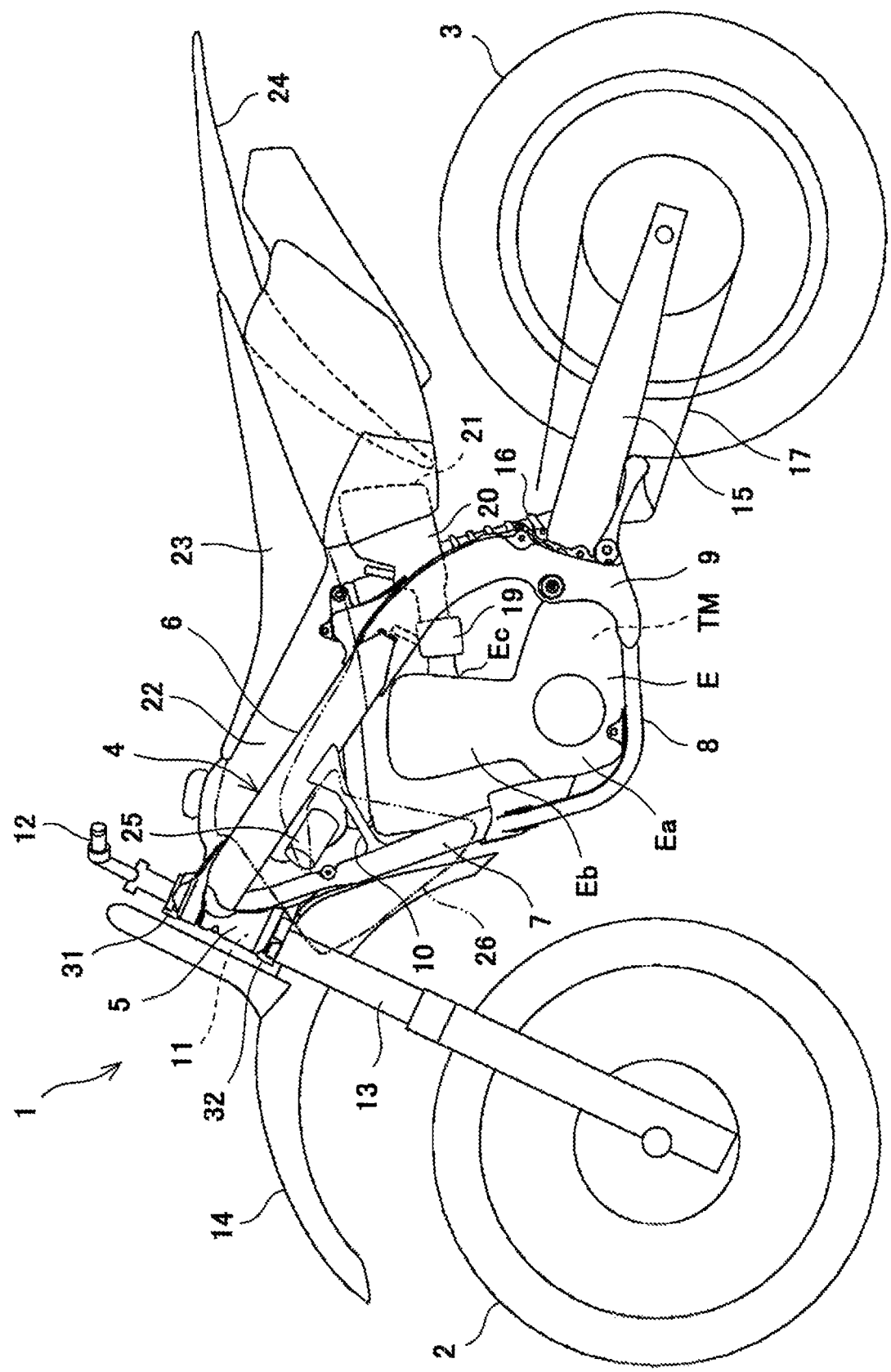
FIG. 1 is a left side view showing a motorcycle according to an embodiment.

FIG. 1 is a left side view of a motorcycle 1 according to the embodiment. As shown in FIG. 1, the motorcycle 1 is a motocross type and is able to travel off-road (travel on an uneven road). The motorcycle 1 includes a front wheel 2, a rear wheel 3, and a vehicle body frame 4. The vehicle body frame 4 includes a head pipe part 5, a pair of right and left main frame parts 6, a down frame part 7, a lower frame part 8, a pair of right and left pivot frame parts 9, and a bridge frame part 10. The vehicle body frame 4 includes these frame parts which are joined to each other by welding.

The head pipe part 5 is a tubular member with a vertical axis line. The pair of right and left main frame parts 6 extend rearward from the upper portion of the head pipe part 5 while being inclined in a downward direction. The down frame part 7 extends downward from the lower portion of the head pipe part 5 to a location that is below the main frame parts 6. The lower frame part 8 extends from the lower portion of the down frame part 7, is bent in a substantially-L shape in a side view, and extends rearward. The pair of right and left pivot frame parts 9 couple the rear portions of the main frame parts 6 to the rear portion of the lower frame part 8. The bridge frame part 10 couples the main frame part 6 to the down frame part 7 in a gusset shape. The main frame parts 6 and the down frame part 7 are joined to the head pipe part 5 by welding. The bridge frame part 10 is joined to the main frame parts 6 and to the down frame part 7 by welding. In other words, weld (welding) beads are present on the outer surface of the vehicle body frame 4.

A steering shaft 11 is rotatably inserted into the head pipe part 5. An upper bracket 31 is provided at the upper portion of the steering shaft 11. An under bracket 32 is provided at the lower portion of the steering shaft 11. A bar-type handle 12 is attached to the upper bracket 31. The upper portions of a pair of right and left front forks 13 are connected to the upper bracket 31 and the under bracket 32. The lower portions of the front forks 13 support the front wheel 2 so that the front wheel 2 is rotatable. A front fender 14 is disposed above the front wheel 2. When the rider rotates the handle 12, the front wheel 12 is steered via the steering shaft 11 and the front forks 13.

The front end portions of a swing arm 15 extending in a substantially forward and rearward direction are mounted on the pivot frame parts 9, respectively so that the swing arm 15 is pivotable. The rear wheel 3 which is a drive wheel is rotatably supported by the rear portion of the swing arm 15. A rear suspension 16 extending in a substantially vertical direction is disposed between the swing arm 15 and the upper portion of the pivot frame part 9. An engine E is disposed in a space surrounded by the main frame parts 6, the down frame part 7, the lower frame part 8, and the pivot frame parts 9. The engine E is secured to the frame parts of the vehicle body frame 4. The engine E is an air-cooled engine. Therefore, a radiator is not provided forward of the engine E.

The engine E includes a crankcase part Ea and a cylinder part Eb extending upward from the upper portion of the crankcase part Ea. A transmission TM is accommodated in the rear portion of the crankcase part Ea. An output shaft (not shown) of the transmission TM is configured to transmit driving power generated in the engine E to the rear wheel 3 via a driving power transmission member 17 such as a chain or a belt. A throttle device 19 is connected to an air-intake port Ec formed in the rear portion of the cylinder part Eb of the engine E, via an air-intake pipe extending rearward. An air-intake duct 20 is connected to the rear portion of the throttle device 19. An air cleaner 21 is connected to the rear portion of the air-intake duct 20.

A fuel tank 22 is disposed in a space formed between the pair of right and left main frame parts 6 in a state in which the fuel tank 22 is supported by the main frame parts 6. The fuel tank 22 protrudes more upward than the main frame parts 6. A seat 23 is disposed behind the fuel tank 22. The rider can straddle the seat 23. A rear fender 24 is disposed below the seat 23, rearward of the air cleaner 21, and above the rear wheel 3. A canister 25 is disposed rearward of the head pipe part 5. The canister 25 is configured to reserve therein evaporated fuel (evaporative emission) from the fuel tank 22. The canister 25 is disposed above the rear edge of the front fender 14. This makes it possible to prevent a situation in which muddy water or the like flying from the front wheel 2 contacts the canister 25. The canister 25 is covered by a shroud 26 from an outer side in a vehicle width direction. The shroud 26 serves to protect the canister 25 and improves the external appearance of the motorcycle 1.

Figure 2:
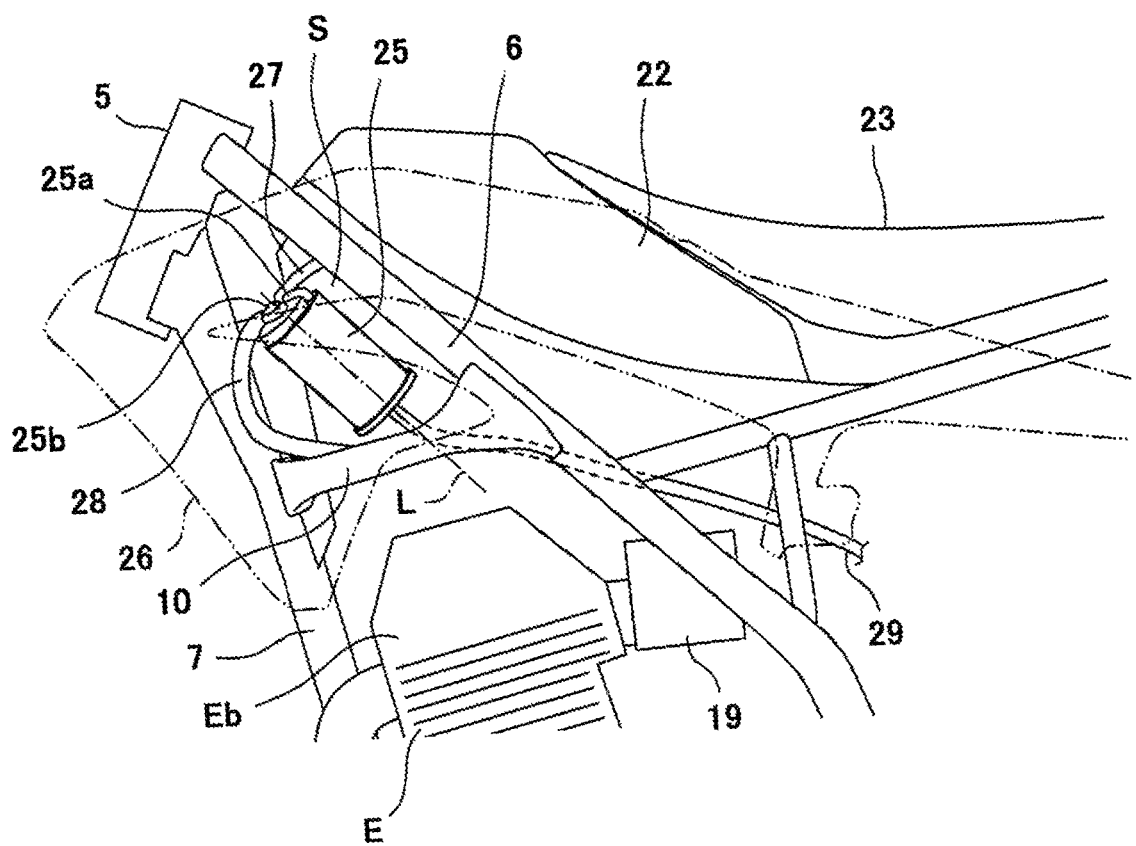
FIG. 2 is an enlarged side view showing major components (constituents) of the motorcycle of FIG. 1.
Figure 3:
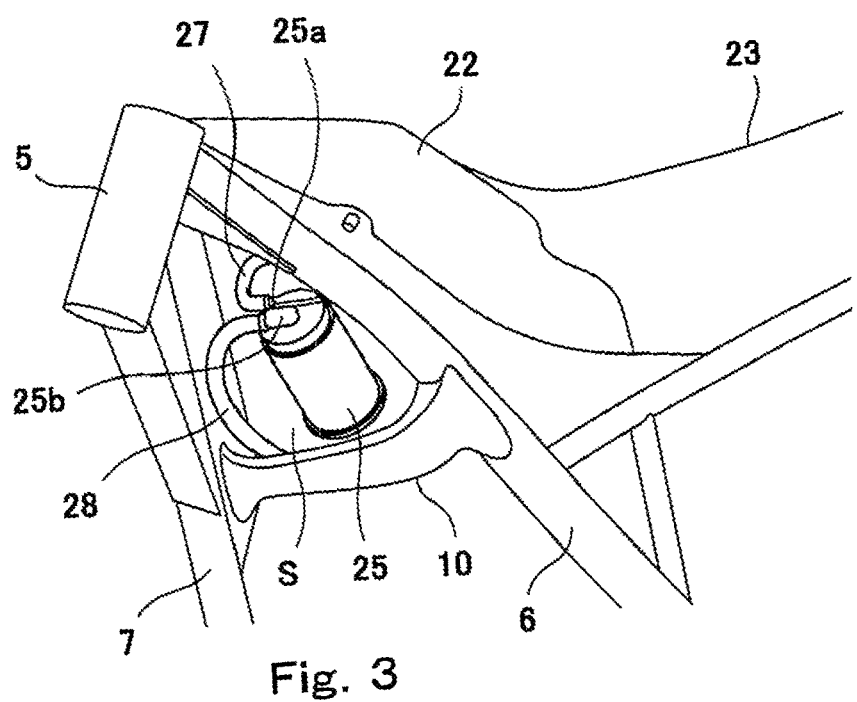
FIG. 3 is a perspective view showing the major components of the motorcycle of FIG. 2, when viewed obliquely from the left and the front.

FIG. 2 is an enlarged side view showing major components of the motorcycle 1 of FIG. 1. FIG. 3 is a perspective view showing the major components of the motorcycle 1 of FIG. 2, when viewed obliquely from the left and the front. As shown in FIGS. 2 and 3, the canister 25 is disposed on a first side (e.g., left side) in the vehicle width direction. An inlet port 25a and an outlet port 25b are provided at the front end of the canister 25. The downstream end of an inlet tube 27 is connected to the inlet port 25a. The upstream end of the inlet tube 27 is connected to the fuel tank 22. The evaporated fuel (evaporative emission) generated in the fuel tank 22 is led to the canister 25 via the inlet tube 27. The upstream end of an outlet tube 28 is connected to the outlet port 25b. The downstream end of the outlet tube 28 is connected to an air-intake passage (e.g., throttle device 19) for supplying air to the engine E. In this configuration, the fuel from the canister 25 is mixed with the air in the air-intake passage, and an air-fuel mixture is supplied to the engine E.

When viewed from the side (in a side view), the canister 25 is disposed in a region (space) S with a substantially triangular shape, which is surrounded by the head pipe part 5, the main frame part 6, the down frame part 7, and the bridge frame part 10. For example, when viewed from the side, the canister 25 is entirely disposed in the region S surrounded by the head pipe part 5, the main frame part 6, the down frame part 7, and the bridge frame part 10. When viewed from the side, the canister 25 is disposed to extend along the main frame part 6. More specifically, the canister 25 has an elongated shape from its front end to its rear end, and an axis line L extending in the lengthwise direction of the canister 25 is disposed in parallel with the main frame part 6 in a side view. In the present embodiment, the canister 25 has a cylindrical shape.

The inlet port 25a and the outlet port 25b of the canister 25 open inward in the vehicle width direction. The inlet tube 27 and the outlet tube 28 extend inward in the vehicle width direction, from the front end of the canister 25. The inlet tube 27 and the outlet tube 28 are disposed in a space formed rearward of the head pipe part 5. The upstream end of a drain tube 29 is connected to the rear end of the canister 25. The drain tube 29 extends rearward at a location that is inward of the main frame part 6 in the vehicle width direction. The downstream end of the drain tube 29 is disposed rearward of the engine E. A least a portion of the main frame part 6, at least a portion of the down frame part 7, at least a portion of the bridge frame part 10, and at least a portion of the canister 25 are covered by the shroud 26, from the side.

In the above-described layout, the canister 25 can be suitably protected by the head pipe part 5, the main frame part 6, the down frame part 7, the bridge frame part 10, and the shroud 26. In addition, the canister 25 is disposed in a narrow space which is close to the fuel tank 22 without using a space for other components (constituents). In this way, vehicle components can be more efficiently disposed in the motorcycle 1.

The canister 25 is entirely disposed above the upper end of the engine E. The upper end of the engine E is located below the bridge frame parts 10. The canister 25 is inclined in a forward direction and in an upward direction so that its front end is directed upward. In this configuration, each of the inlet tube 27 and the outlet tube 28 is disposed at a sufficient distance from the engine E in a vertical direction. This makes it possible to prevent the inlet tube 27 and the outlet tube 28 from being heated by heat radiated from the engine E.

Figure 4:
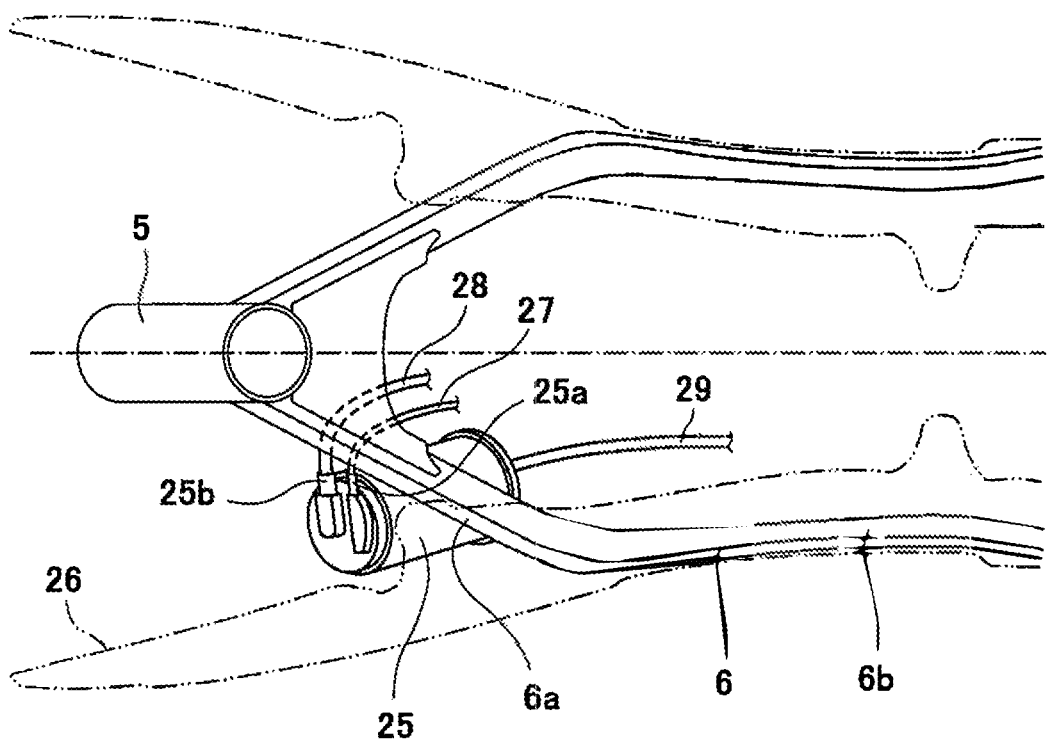
FIG. 4 is a top plan view showing a positional relation between a vehicle body frame and a canister of the motorcycle of FIG. 2.

FIG. 4 is a top plan view showing a positional relation between the vehicle body frame 4 and the canister 25 of the motorcycle 1 of FIG. 2. As shown in FIG. 4, when viewed from above (in a top plan view), the pair of right and left main frame parts 6 include a pair of right and left main frame front parts 6a extending rearward and outward in the vehicle width direction from the head pipe part 5, and a pair of right and left main frame rear parts 6b extending rearward in the forward and rearward direction from the pair of right and left main frame front parts 6a, respectively. The canister 25 is disposed on the first side (e.g., left side) in the vehicle width direction, with respect to a vehicle body center line C extending in the forward and rearward direction. More specifically, when viewed from above, the canister 25 is disposed to partially overlap with the left main frame front part 6a. In this configuration, it becomes possible to suitably protect the canister 25 by the main frame part 6 from external forces applied from above and easily reduce the width of the motorcycle 1.

The canister 25 is inclined obliquely with respect to the forward and rearward direction so that its front end is directed outward in the vehicle width direction. The front end of the canister 25 is located outward of the main frame front part 6a in the vehicle width direction. In this configuration, the space used to place the inlet tube 27 and the outlet tube 28 extending inward in the vehicle width direction from the inlet port 25a and the outlet port 25b, respectively, of the canister 25 is not narrow. Therefore, the inlet tube 27 and the outlet tube 28 can be naturally curved.

The rear end of the canister 25 is located inward of the main frame front part 6a in the vehicle width direction. Therefore, the drain tube 29 connected to the rear end of the canister 25 extends inward in the vehicle width direction. This allows the drain tube 29 to avoid the bridge frame part 10 or the like without being forcibly bent. Since the drain tube 29 is away from the main frame part 6, it becomes possible to prevent a situation in which the drain tube 29 rubs the weld (welding) beads or the like of the main frame part 6.

Since the canister 25 extends forward and upward, the front end of the canister 25 is directed upward. An assembly operator can easily see the inlet port 25a and the outlet port 25b of the canister 25 from above. Therefore, the assembly operator can easily perform assembly work for connecting the inlet tube 27 and the outlet tube 28 to the canister 25.

Figure 5:
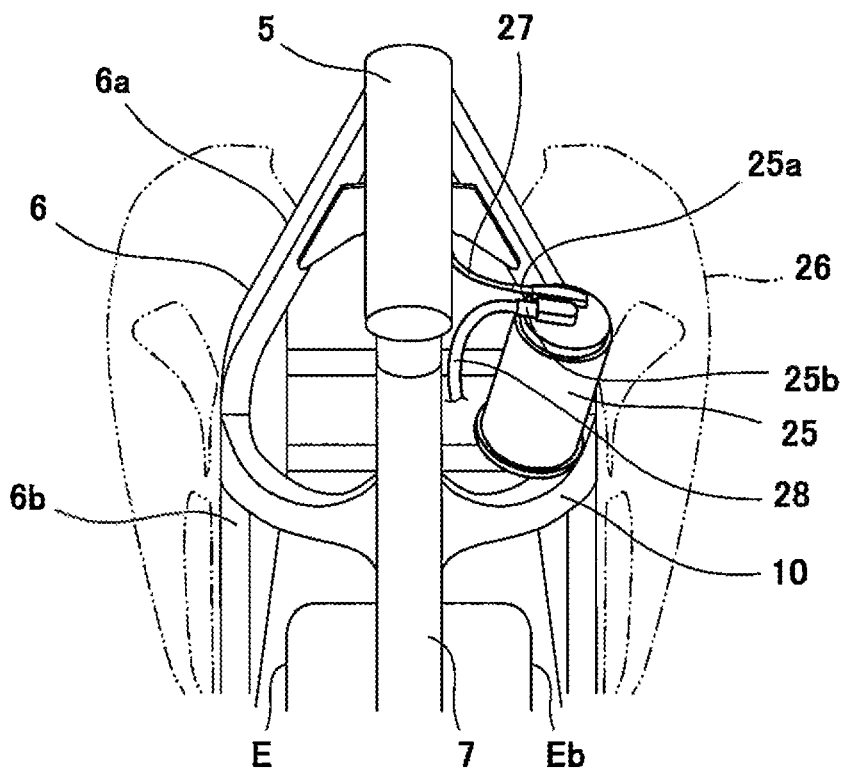
FIG. 5 is a front view showing the motorcycle of FIG. 2, when viewed from the front.

FIG. 5 is a front view of the motorcycle 1 of FIG. 2. As shown in FIG. 5, in a front view, a center of gravity of the canister 25 is located in a region surrounded by the main frame part 6, the down frame part 7, and the bridge frame part 10. In the front view, the canister 25 is exposed so that the canister 25 can be seen from the front. During traveling of the motorcycle 1, the air flowing from the front directly contacts the canister 25. Even in a case where the temperature of the canister 25 is increased by the heat radiated from the engine E, the canister 25 can be naturally cooled by the air. Since the canister 25 is entirely located above the upper end of the engine E, the canister 25 does not impede air-cooling for the engine E.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

What is claimed is:
1. A motorcycle comprising:
   a vehicle body frame including a head pipe part, a pair of right and left main frame parts extending rearward from the head pipe part while being inclined in a downward direction, a down frame part extending downward from the head pipe part to a location that is below the pair of right and left main frame parts, and a bridge frame part coupling one of the pair of right and left main frame parts to the down frame part;
   a fuel tank supported by the pair of right and left main frame parts; and
   a canister connected to the fuel tank via an inlet tube and configured to store therein evaporated fuel generated in the fuel tank, wherein the canister is disposed on a first side in a vehicle width direction, with respect to a vehicle body center line extending in a forward and rearward direction, and wherein in a side view and a front view, at least a portion of the canister is disposed in a region surrounded by the one of the pair of right and left main frame parts, the down frame part, and the bridge frame part.

2. The motorcycle according to claim 1,
wherein in the side view, the canister is disposed to extend along the one of the pair of right and left main frame parts.

3. The motorcycle according to claim 1,
wherein in the front view, the canister is exposed so that the canister is seen from a front.

4. The motorcycle according to claim 1, further comprising:
an air-cooled engine disposed below the fuel tank,
wherein the canister is entirely disposed above and forward of an upper end of the air-cooled engine.

5. The motorcycle according to claim 1, further comprising:
a front fender disposed above a front wheel,
wherein the canister is disposed above a rear edge of the front fender.

6. The motorcycle according to claim 1, further comprising:
a shroud covering the canister from an outer side in the vehicle width direction.

7. The motorcycle according to claim 1, wherein when viewed from above, the canister is disposed to partially overlap with one of the right and left main frame parts.

8. A motorcycle comprising:
a vehicle body frame including a head pipe part, a pair of right and left main frame parts extending rearward from the head pipe part while being inclined in a downward direction, a down frame part extending downward from the head pipe part to a location that is below the pair of right and left main frame parts, and a bridge frame part coupling one of the pair of right and left main frame parts to the down frame part;
a fuel tank supported by the pair of right and left main frame parts;
a canister connected to the fuel tank via an inlet tube and configured to store therein evaporated fuel generated in the fuel tank; and
a drain tube connected to a rear end portion of the canister,
wherein the canister is disposed on a first side in a vehicle width direction, with respect to a vehicle body center line extending in a forward and rearward direction,
wherein in a side view, the canister is disposed in a region surrounded by the one of the pair of right and left main frame parts, the down frame part, and the bridge frame part, and
wherein in a top plan view, the canister crosses the one of the pair of right and left main frame parts so that a rear end portion of the canister is directed inward in the vehicle width direction.

9. The motorcycle according to claim 8,
wherein the inlet tube extends inward in the vehicle width direction, from a front end portion of the canister.

10. A motorcycle comprising:
a vehicle body frame including a head pipe part, a pair of right and left main frame parts extending rearward from the head pipe part while being inclined in a downward direction, a down frame part extending downward from the head pipe part to a location that is below the pair of right and left main frame parts, and a bridge frame part coupling one of the pair of right and left main frame parts to the down frame part;
a fuel tank supported by the pair of right and left main frame parts; and
a canister connected to the fuel tank via an inlet tube and configured to store therein evaporated fuel generated in the fuel tank,
wherein the canister is disposed on a first side in a vehicle width direction, with respect to a vehicle body center line extending in a forward and rearward direction,
wherein in a side view, the canister is disposed in a region surrounded by the one of the pair of right and left main frame parts, the down frame part, and the bridge frame part,
wherein in a top plan view, the pair of right and left main frame parts include a pair of right and left main frame front parts extending rearward and outward in the vehicle width direction from the head pipe part, and a pair of right and left main frame rear parts extending rearward in the forward and rearward direction from the pair of right and left main frame front parts, respectively, and
wherein in the top plan view, the canister overlaps with one of the pair of right and left main frame front parts.

11. A motorcycle comprising:
a vehicle body frame including a head pipe part, a pair of right and left main frame parts extending rearward from the head pipe part while being inclined in a downward direction, a down frame part extending downward from the head pipe part to a location that is below the pair of right and left main frame parts, and a bridge frame part coupling one of the pair of right and left main frame parts to the down frame part;
a fuel tank supported by the pair of right and left main frame parts; and
a canister connected to the fuel tank via an inlet tube and configured to store therein evaporated fuel generated in the fuel tank,
wherein the canister is disposed on a first side in a vehicle width direction, with respect to a vehicle body center line extending in a forward and rearward direction,
wherein in a side view, the canister is disposed in a region surrounded by the one of the pair of right and left main frame parts, the down frame part, and the bridge frame part, and
wherein in a front view, a center of gravity of the canister is located in the region surrounded by the one of the pair of right and left main frame parts, the down frame part, and the bridge frame part.

\* \* \* \* \*